(No Model.)
E. BEHNE.
BASKET.
No. 505,694. Patented Sept. 26, 1893.
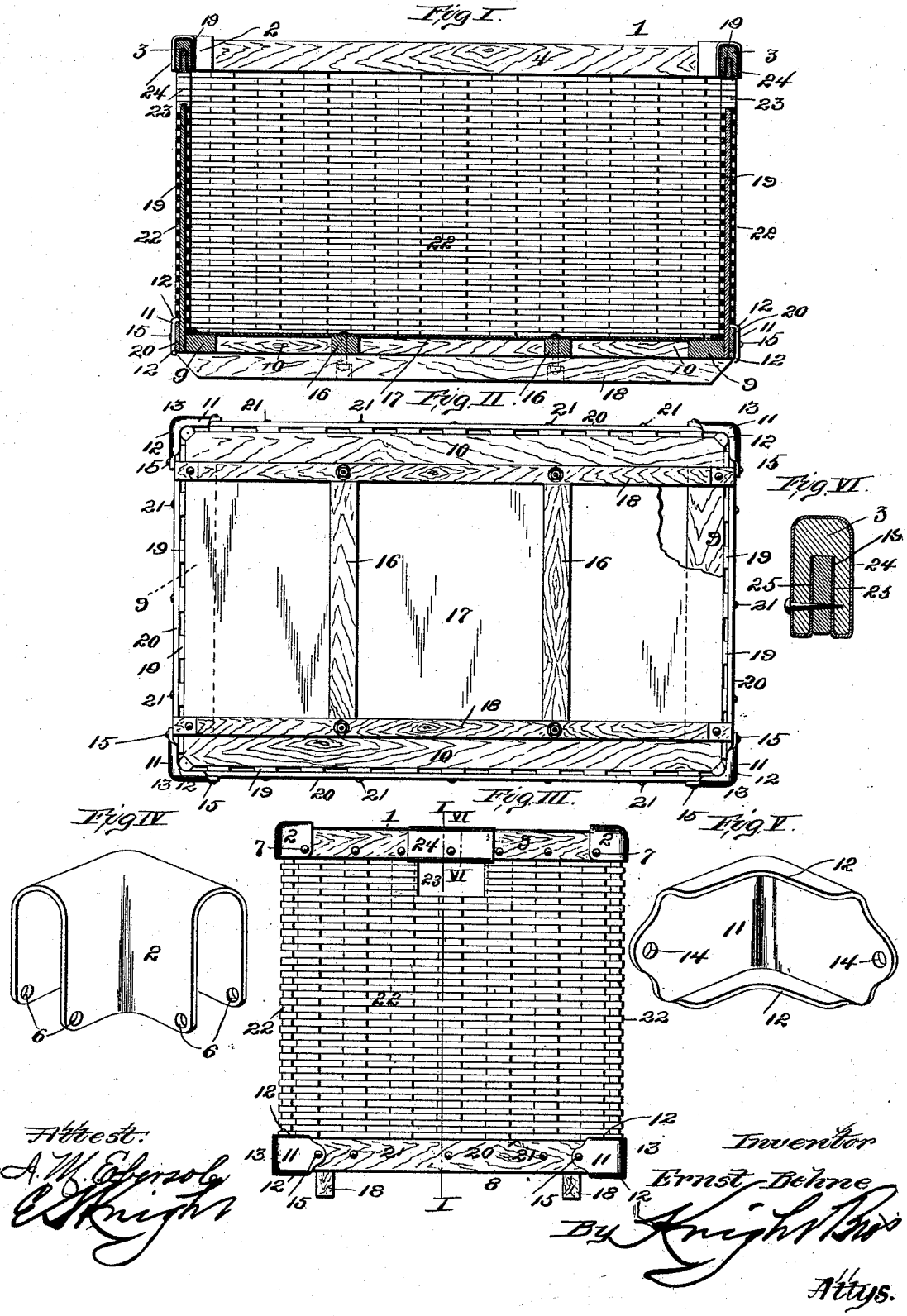

UNITED STATES PATENT OFFICE.

ERNST BEHNE, OF ST. LOUIS, MISSOURI.

BASKET.

SPECIFICATION forming part of Letters Patent No. 505,694, dated September 26, 1893.

Application filed June 5, 1893. Serial No. 476,553. (No model.)

*To all whom it may concern:*

Be it known that I, ERNST BEHNE, of the city of St. Louis, in the State of Missouri, have invented a certain new and useful Improvement in Baskets, of which the following is a full, clear, and exact description, reference being had to the accompanying drawings, forming part of this specification.

My invention relates to an improved basket, intended more particularly for warehouse, store and other heavy, rough usage; and my invention consists in features of novelty hereinafter fully described and pointed out in the claims.

Figure I is a vertical, longitudinal section through my improved basket, taken on line I—I, Fig. III. Fig. II is a bottom view. Fig. III is an end view. Fig. IV is a perspective view of one of the upper corner clips. Fig. V is a perspective view of one of the lower corner clips; and Fig. VI is an enlarged, detail section, taken on line VI—VI, Fig. III.

Referring to the drawings, 1 represents an upper frame, joined at the corners by clips 2; this frame consisting of end pieces 3 and side pieces 4; the clips 2 serving to connect the end pieces to the side pieces. The preferred form of these clips is shown in Fig. IV, which will be readily understood without specific description. The clips are provided with perforations 6 to receive rivets by which they are attached to the frame, as shown at 7, Fig. III.

8 represents a lower frame composed of end pieces 9, and side pieces 10, which are connected together by clips 11, the form of these clips being shown in Fig. V. Each clip has a pair of flanges 12, fitting over the edges of the frame, as shown at 13, Fig. III, and each clip has perforations 14 by which they are attached, through means of nails or rivets to the frame, as shown at 15, Fig. III. The side pieces 10 of the frame 8 are connected by cross pieces 16, as shown in Figs. I and II. The bottom 17 of the basket is composed of sheet metal, secured to the upper side of the frame 8, and to the cross pieces 16, as shown in Fig. I. By making the bottom of sheet metal it is not liable to give out, or crack, as would be the case with wood, which is liable to crack with the grain.

18 represents runners secured to the frame 8, and upon which the basket may be moved, when filled. It is evident that rollers might be used in place of these runners.

The body of the basket, between the frames 1 and 8, is composed of vertical strips 19 of wood, the upper ends of which fit in a groove in the lower edge of the frame 1, as shown in Figs. I and VI. The lower ends of these vertical strips as shown in Figs. I and II are held between the frame 8 and strips 20 running parallel with the sides and ends of the frame 8, and are secured at suitable intervals by means of nails or tacks 21. The lower corner clips 11 serve also to hold these strips 20 in place, as shown in Fig. II. The vertical strips 19 are interwoven by strips 22 of willow or rattan; these strips 22 and vertical strips 19 forming the body of the basket between the upper and lower frames.

23 represents hand-holds formed in the ends of the basket beneath the top frame 1, and at these points the ends of the top frame are preferably faced with metal pieces 24, the ends of which enter the groove in the top frame, as shown at 25, Fig. VI. A basket thus made is strong and durable, as well as being cheap.

I claim as my invention—

1. A basket comprising the lower frame 8 having end pieces 9 and side pieces 10, the bottom 17, the upper frame 1 having side pieces 4, and end pieces 3 formed with grooves, the vertical strips 19 having their upper ends inserted in the grooves, the strips 20 holding the vertical strips by their lower ends to the lower frame, the horizontal strips interwoven with the vertical strips, and clips secured to the corners; substantially as described.

2. In a basket, the combination of an upper frame and lower frame, corner clips 2 connecting the ends and sides of the upper frame, corner clips 11 connecting the ends and sides of the lower frame, cross-pieces 16, joining the sides of the lower frame, a bottom 17 secured to the lower frame, vertical strips 19 connecting the upper and lower frames together and which fit in grooves in the upper frame, and are held by strips 20 to the lower frame, and horizontal strips 22 interwoven in the vertical strips; substantially as and for the purpose set forth.

ERNST BEHNE.

In presence of—
A. M. EBERSOLE,
E. S. KNIGHT.